United States Patent [19]

Blach

[11] 3,746,319
[45] July 17, 1973

[54] MIXING OF MATERIALS
[76] Inventor: Josef Blach, Sucystrasse 24, Bietigheim-Buch, Germany
[22] Filed: Oct. 22, 1971
[21] Appl. No.: 191,256

[30] Foreign Application Priority Data
Oct. 22, 1970 Austria .............................. 9520/70

[52] U.S. Cl. .................................... 259/192, 259/6
[51] Int. Cl. ............................ B29b 1/10, B01f 7/08
[58] Field of Search ....................... 259/6, 104, 192, 259/41

[56] References Cited
UNITED STATES PATENTS
| | | | |
|---|---|---|---|
| 1,290,505 | 1/1919 | Bulley .................................. | 259/192 |
| 2,581,451 | 1/1952 | Sennet .................................... | 259/6 |
| 2,788,196 | 4/1957 | Jacobi et al. ........................... | 259/6 |
| 2,802,238 | 8/1957 | Colombo ............................ | 259/192 |
| 3,269,708 | 8/1966 | Leister ........................... | 259/104 X |

Primary Examiner—John Petrakes
Assistant Examiner—Philip R. Coe
Attorney—Michael S. Striker

[57] ABSTRACT

An apparatus for mixing and advancing pulverulent, viscous and/or fibrous materials comprises a housing provided with an elongated interior chamber wherein an intermediate mixing zone is located between two end zones. At least three cooperating mixing and advancing screws are located in this chamber and one of them, with which the other two cooperate, is provided in the intermediate zone with a surface which does not have screw convolutions but is provided with mixing projections, whereas in the same zone the other screws are provided with screw convolutions which are of different pitch and/or of different inclination.

10 Claims, 4 Drawing Figures

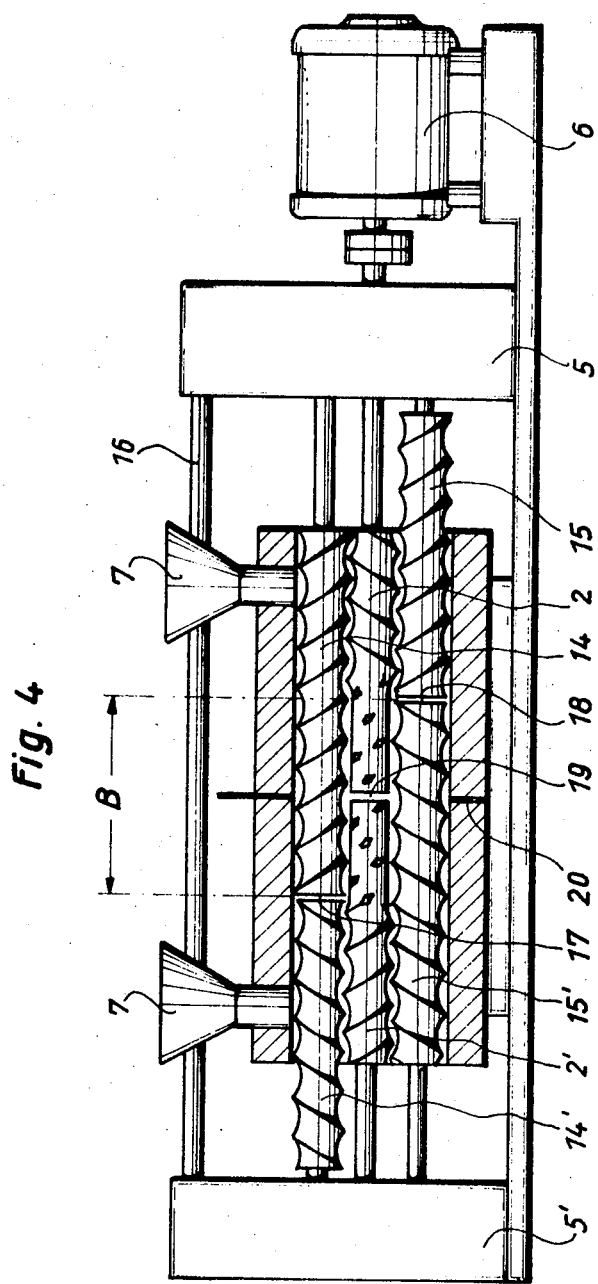

MIXING OF MATERIALS

BACKGROUND OF THE INVENTION

The present invention generally relates to the mixing and advancing of materials, and more particularly to the mixing and advancing of pulverulent, viscous and-/or fibrous materials. Still more particularly the invention relates to an apparatus for such mixing and advancing.

The art already knows apparatuses in which materials of the type here under discussion are advanced by advancing screws, for instance from one end of the apparatus to the other end, and during such advancement are mixed and kneaded. It is general usage in the art, including in publications relating to this field, to speak of "mixing" and "kneading" to describe the processing which the material undergoes in the above-mentioned type of apparatus. If such apparatus operates continuously I prefer, however, to replace these terms with "longitudinal mixing" and "transverse mixing" because I believe that these terms are more accurately descriptive of the effect upon the materials in the apparatus.

If in an apparatus of this type the transverse mixing effect is to be improved, which is of course desirable, then the drop or differential between the speed of movement of screw and housing must be transmitted into the material being processed. This is primarily accomplished by decreasing the depth of the screw convolutions and/or increasing the pitch of these convolutions. In addition the transverse mixing can also be influenced by the speed of rotation of the screw, the extent to which the chamber in which the screw or screws rotate is filled with material, and the temperature at which the mixing takes place.

Longitudinal mixing by contrast is not nearly as readily influenced. Longitudinal mixing is determined largely and basically by the type of apparatus utilized. Thus, single-screw extruders have a broad material dwell time range which can be influenced relatively significantly by the type of material being processed and the processing conditions. On the other hand, multiple screw extruders wherein the screws turn in opposite sense and mesh with small play, have a median dwell time distribution or range which is subject to only very little influencing by the type of material processed and the processing conditions.

A third type of apparatus, utilizing multiple screws which mesh but which rotate in one and the same sense, has operational characteristics which are somewhat between the two first-mentioned types and in which, given otherwise unchanged operating conditions, the dwell time distribution can be varied within certain limits by appropriate measures, such as changes in the play of the meshing screws, interruptions in the screw convolutions and the like. Evidently, such measures can be taken from case to case by exchanging screw sections when it is desired to obtain a variation.

As in most industries, there is a tendency to ever greater demands which are being made of the type of apparatus under discussion. This is true both of apparatus for mixing materials and of apparatus for kneading materials, and especially of apparatus which carries out these operations continuously. If these demands which are made of an apparatus for continuous kneading of materials are juxtaposed with the demands which are made of an apparatus for continuous mixing of materials, the picture which emerges is as follows:

It is required of the mixer that it provide a well defined broad material dwell time distribution, meaning that the paths over which each particle of material passes should be of unequal length in order to obtain rapid distribution and admixture of the various particles of the material. On the other hand, the lowest possible energy should be required and transmitted to the material being mixed, in order to prevent undesired development of heat in the material. The material should be treated as gently as possible because the structure of the individual particles should be retained to the maximum possible extent, and finally the mixing volume of the apparatus should be as great as possible.

On the other hand, the demands which are made of an apparatus for kneading materials are quite different: The dwell time distribution should be well defined and small, that is the individual paths traversed by particles of the material should be as nearly of equal length as possible because the apparatus should be capable of transmitting equal amounts of energy to the material, regardless of whether the quantity of material being processed is very large or very small. A maximum amount of energy should be transmitted to the material for kneading purposes, which means that the material will undergo significant heating. The structure of the particles should be destroyed or deformed, that is it is not important that the particles do not undergo any change. Finally, the material should be treated in relatively thin layers, that is in small volumes.

Apparatus of the type mentioned earlier, using screws, of course performs both the mixing and kneading function. The juxtaposition of the requirements for mixing and for kneading indicates that it is not possible to obtain both these functions to the optimum desired effect in one and the same zone, that is mixing and kneading cannot be carried out in a single zone (contemporaneously) in such a screw-type apparatus.

Furthermore, the known screw-type apparatus have the additional disadvantage that no precisely defined mixing volume exists, because mixing really only is a result of the advancing of the material along and by the screw. Some apparatus which has become known provides two screws which extend in parallelism with one another and have adjacent screw sections wherein the screws are of identical pitch and identical direction, with one of the screws having a section which is smooth and provided only with mixing projections. Here, however, the same disadvantage as outlined above obtains, in that mixing and kneading is still only essentially a function of the advancement of the material along and by the screw.

SUMMARY OF THE INVENTION

It is a general object of the present invention to provide an improved apparatus of the type under discussion which is not possessed of the aforementioned disadvantages.

More particularly it is an object of the present invention to provide such an apparatus which affords a precisely defined mixing volume.

Another object of the invention is to provide such an apparatus which achieves optimum admixture of materials at lowest possible energy requirement.

A concomitant object of the invention is to provide such an apparatus which, while affording the precisely defined mixing volume, will carry out the admixture discontinuously.

In pursuance of the above objects, and of others which will become apparent hereafter, one feature of the invention resides in an apparatus of the character described above which comprises, briefly stated, housing means having an interior elongated chamber an intermediate zone of which is located between two end zones. At least three cooperating mixing and advancing screws are located in this chamber, extending longitudinally thereof. One of these screws has in the intermediate zone a surface free from screw convolutions but provided with a plurality of mixing projections, and the other screws each cooperate with this one screw and are each provided in the intermediate zone with surfaces having respectively differing screw convolutions, that is the screw convolutions are of different direction and/or different pitch.

Preferably the projections on the one screw are provided by forming the latter on the aforementioned surface thereof with the type of screw convolutions provided on the other two screws, that is first forming screw convolutions corresponding to one of the other screws and then forming on these convolutions the additional screw convolutions corresponding to the second one of the other screws, whereby most of the material which would ordinarily constitute the screw convolutions is removed and only projections remain which serve the desired mixing purpose.

With the apparatus according to the present invention there is defined in the mixing zone a precisely predeterminable mixing volume which can be theoretically calculated from the differences in the screw convolutions of the aforementioned other screws. If the screw convolutions of these other screws are of different inclination or direction, it is further possible to obtain a circulation of the material in the mixing zone, thus making it possible for the apparatus to operate as a discontinuous mixer.

According to a currently preferred embodiment the screw having the projections may be in form of two axially aligned sections which have ends located in the mixing zone of the chamber, spaced from one another, and which are provided in the end zones of the chamber, that is in the advancing zones for material, with right-hand and left-hand screw convolutions. The other two cooperating screws are then provided in these end zones with screws convolutions which are opposite to those of the respective screw section. An apparatus constructed in this manner is typical for a discontinuous mixer according to the present invention with circulation of the material in the mixing zone, if the convolutions of the other screws —which are directed in mutually opposite directions— extend into the mixing zone and overlap one another along the mixing zone. It will be appreciated that as long as no additional material is admitted into the machine the material accommodated in the mixing zone will simply circulate in the same without advancing out of it.

According to another embodiment of the invention the apparatus can also be constructed so as to permit a continuous variation of the mixing zone and thereby the mixing volume. To achieve this the screw having the projections is again made of two axially aligned sections. In addition, the other two screws are each also in form of two axially aligned sections which can be shifted axially of themselves and of the chamber. In particular it is advantageous if the spacing between the juxtaposed ends of the respective pairs of sections is identical for all three screws. In such an embodiment it is for instance possible to produce objects out of duromeric substances, modified with reinforcing materials and/or blowing agents, in desired quantities and at desired intervals. The continuous variability of the mixing volumes during the operation of such an apparatus is important if, for instance, the admixture of two products in the shortest period of time involves a chemical reaction and if this mixture is necessary in batch-type operation as is the case if individual objects are to be produced, or if the mixing volume must be optimally accommodated to the processing. If individual objects are to be produced, the degree of overlapping of the two other screws, that is the ones which do not have the mixing projections, is continuously reduced to zero towards the end of the mixing procedure, so that the two components of material to be mixed no longer become admixed and can no longer react with one another.

This apparatus can be further modified by providing an element which can be moved across the intermediate mixing zone transversely of the axis of the screws, thereby separating the mixing zone and affording a mechanical separation of the two materials or components which, of course, are originally advanced in mutually opposite directions from opposite sides into the mixing zone. It is particularly advantageous that no air can enter into the mixing zone in such an apparatus, nor that it is necessary to introduce any flushing agents for cleaning purposes.

The apparatus according to the present invention may also be used for the production of tubular components, for which purpose the outlet opening—which communicates with the mixing zone—is provided with a central mandrel extending transversely across the mixing zone and around which the material must flow through the outlet opening, thereby producing a tubular element.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 4 is a view similar to FIG. 1 illustrating an additional embodiment of the invention.

DESCRIPTION OF THE PREFERRED EMBODIMENTS

Figure 1:
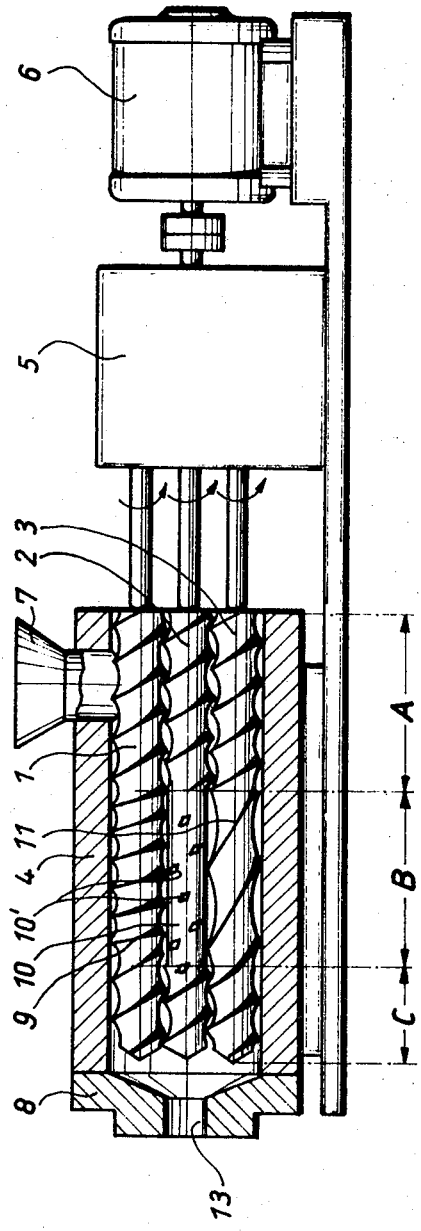
FIG. 1 is a vertical longitudinal section illustrating an apparatus according to one embodiment of the invention.

Discussing firstly the embodiment illustrated in FIG. 1 it will be seen that this apparatus is provided with a housing 4 which in known manner can be heated and/or cooled as is required by the particular material to be processed, or by the particular processing requirements. Located in the interior chamber of the housing 4, which chamber has an intermediate mixing zone B and two end zones A and C in which the material is advanced longitudinally of the housing, are three parallel screws 1, 2 and 3. These screws are turned in identical directions by a reduction drive 5 which in turn is driven by the prime mover 6. Details of the drive 5 and the prime mover 6 need not be described because they are conventional and entirely known per se to those skilled in the art.

The materials to be processed, that is mixed and kneaded, are introduced through a hopper 7 located at one end of the apparatus and are advanced by the screws through the zone A into the mixing zone B, wherein they become admixed and from where they pass through the zone C to the outlet opening 13. The latter is located in the end wall 8 of the apparatus the inner side of which is conically configurated towards the outlet opening in order to channel and form the material as it moves towards the outlet opening 13.

An inspection of FIG. 1 indicates that all three screws 1, 2 and 3 are provided within the zones A and C with screw convolutions having the same direction and the same pitch, and that they mesh with one another, that is that the screws 1 and 3 mesh with the convolutions of the screw 2. However, in the mixing zone B the screw 1 has screw convolutions 9 of lower pitch whereas the screw 3 has screw convolutions 11 of greater pitch. The surface 10 of the screw 2, on the other hand, is smooth except for mixing projections 10' in the mixing zone B. The mixing projections 10' are preferably, but not necessarily produced on the surface 10' in that the screw 2 is provided first with screw convolutions corresponding to the ones identified with reference numeral 9 for screw 1, and subsequently with screw convolutions corresponding to those identified with reference numeral 11 for the screw 3, or vice versa. In either case the screw convolutions which are produced last will partially destroy those which are produced first, whereby most of the material making up the screw convolutions is removed and only the projections 10' remain.

Figure 3:
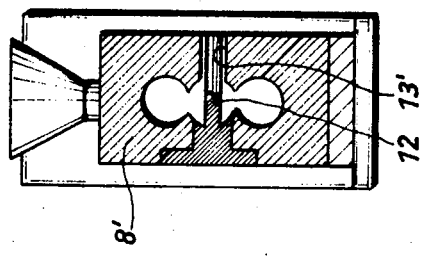
FIG. 3 is a section taken on line III—III of FIG. 2.
Figure 2:
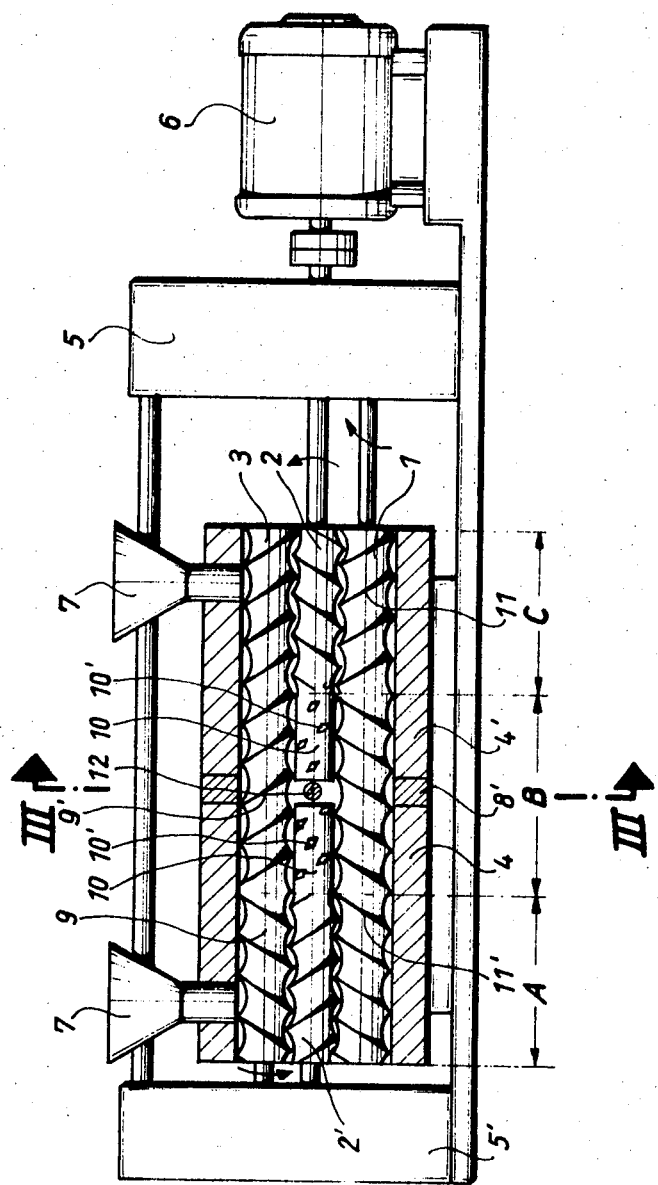
FIG. 2 is a view similar to FIG. 1 but illustrating a further embodiment of the invention.

A further embodiment of the invention is illustrated in FIGS. 2 and 3. This apparatus is particularly advantageous for the mixing and extruding of fiber-reinforced materials wherein the fibers are to be as evenly distributed as possible in the finished mixture in order to serve as uniform reinforcements. This apparatus is provided at its opposite ends with hoppers 7 through which different materials may be introduced, for instance polyester, glass fibers and hardener through one of the hoppers 7 and polyester, glass fibers and accelerator through the other of the hoppers 7, with the substances requiring to be admixed with one another in order to obtain a mixture which will harden at a hardening speed which can be adjusted. Located between the screws 1 and 3, corresponding to the same ones discussed in FIG. 1, is a screw which is composed of the sections 2, 2' and which are in axial alignment with one another. Each of these sections has a surface 10 extending into the mixing zone B and smooth except for the mixing projections 10'. The screws 1 and 3 are provided with screw convolutions 11 and 11' and 9 and 9', respectively, convolutions which are directed in respectively opposite direction but of identical pitch. The projections 10' can be produced in the same manner as discussed with respect to FIG. 1.

The screw sections 2 and 2' are provided in the zones A and C with screw convolutions of mutually opposite direction but of identical pitch, just as the adjacent screw convolutions of the screw 1 and 3 with which they mesh. Two gears or transmissions 5, 5' are driven by the prime mover 6 and in turn drive the screws alternately in opposite direction as indicated by the directional arrows. The housing itself is of two parts 4 and 4' and between its two parts there is mounted a tool 8', for instance an extrusion nozzle through which the material admixed in the zone B leaves the housing. In a wall of this tool 8' which extends parallel to the screws there is provided the outlet opening 13'.

If it is desired that the material is to be extruded in tubular form then a mandrel 12 is located centrally in the outlet opening 13', being mounted in the tool 8' and being so arranged (by means of cross-shaped mounting webs or the like which are not illustrated because conventional) that the fibers which are evenly distributed over the entire circumference of the material being extruded through the annular gap defined between the mandrel 12 and the inner surface bounding the outlet opening 13', and which serve reinforcing purposes, are not locally oriented by the so-called plowshare effect, in order to assure that no weakened zones of low strength will develop in the extruded tubular product which would, of course, negate the purpose of providing the reinforcing fibers in the mixture in the first place.

Coming, finally, to the embodiment illustrated in FIG. 4 it will be seen that here there are again provided screw sections 2 and 2' corresponding to those discussed with respect to FIGS. 2 and 3. Located above and below these screw sections are provided two cooperating screws which in this embodiment, however, are each composed in turn of two axially aligned screw sections 14 and 14' on the one hand, and 15 and 15' on the other hand. The screw convolutions of these two screws, or rather the screw convolutions of the sections 14 and 14' with reference to one another and again of the sections 15 and 15' with reference to one another, are directed in mutually opposite directions and are also directed in directions which are opposite to the convolutions of the respectively cooperating screw sections 2 and 2'. The pitch of the screw convolutions is, however, identical.

The screw sections 2 and 2' are mounted for rotation but cannot be displaced in axial direction, whereas the sections 14, 14' and 15, 15' can be shifted axially, but in such a manner that the spacing between the adjacent ends of the sections 14 and 14', and again of the sections 15 and 15', remains unchanged. This spacing, identified with reference numerals 17 and 18, respectively, as well as the spacing 19 between the adjacent ends of the sections 2 and 2', is slightly larger than the thickness of a slide member 20 which can be moved across the mixing zone B transversely to the axes of the screws.

The mixing volume in the mixing zone B, resulting from the overlapping of the screw sections 14, 14', 15, 15', becomes smaller if the screw sections 14' and 15 rotate faster and the screw sections 15' and 14 rotate slower than the screw sections 2 and 2' which are always driven at non-varying speed. When the ends of the screw sections located at one side of the mixing zone B are located in a common plane transverse to the mixing zone, the mixing volume is in effect zero, so that the mixing zone B can be mechanically separated by the slide member 20.

When the mixing operation is to be begun, the slide member 20 is moved to its withdrawn position and the screw sections 14 and 15' rotate faster whereas the screw sections 14' and 15 rotate slower than the screw sections 2 and 2' until such time as the desired length of the mixing zone B is obtained. Thereupon all screw sections turn at identical speed corresponding to the speed of rotation of the screw sections 2, 2' until shortly before the mixing process is completed.

The drive for the screw sections is supplied by the prime mover 6, such as a motor, via a synchronous shaft 16 and drives 5 and 5', so that the screw sections all rotate in one and the same direction. Material can be admitted by means of the hoppers 7.

It is emphasized that no attempt has been made to describe details of the drives, the manner in which the screw sections are mounted for longitudinal displacement, and similar features because they are all well known in the art and because it is the arrangement and cooperation of the screw sections, and the arrangement and presence or absence of screw convolutions (in the manner described in detail herein) which are important for the invention, with these features having been clearly disclosed.

It will be understood that each of the elements described above, or two or more together, may also find a useful application in other types of constructions differing from the types described above.

While the invention has been illustrated and described as embodied in an apparatus for processing and advancing of materials, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended

1. In an apparatus of the character described, in combination, housing means having an elongated mixing chamber an intermediate mixing zone of which is located between two end zones; and at least three cooperating mixing and advancing screws located in said chamber extending longitudinally thereof, one of said screws having in said intermediate zone a surface free from screw convolutions but provided with a plurality of mixing projections, and the other screws each cooperating with said one screw and having in said intermediate zone surfaces provided with respectively differing screw convolutions.

2. In an apparatus as defined in claim 1, wherein the screw convolutions of a first one of said other screws have a pitch which differs from those of a second one of said other screws.

3. In an apparatus as defined in claim 1, wherein the screw convolutions of a first one of said other screws have a pitch which is directed oppositely to that of the screw convolutions of a second one of said other screws.

4. In an apparatus as defined in claim 1, wherein said mixing projections are provided by forming in said surface of said one screw a first set of screw convolutions corresponding to those of a first one of said other screws, and thereupon forming in said surface and in said first set a second set of screw convolutions corresponding to those of a second one of said other screws, whereby both sets are partially destroyed and the remaining non-destroyed portions thereof constitute said mixing projections.

5. In an apparatus as defined in claim 1, said one screw being composed of two axially aligned sections having in said intermediate zone respective adjacent but spaced ends; said sections being provided in said end portions of said chamber with mutually oppositely pitched screw convolutions, and said other screws being provided in said end portions of said chamber with screw convolutions which are pitched oppositely to those of the respective section of said one screw.

6. In an apparatus as defined in claim 5, said other screws each being composed of two axially aligned screw sections which are shiftable axially of said one screw.

7. In an apparatus as defined in claim 6, further comprising a slidable element provided in said housing for movement transversely across said intermediate zone of said chamber.

8. In an apparatus as defined in claim 7, adjacent ends of said sections and screw sections being spaced from one another by a distance slightly greater than the thickness of said slidable element in direction longitudinally of said chamber.

9. In an apparatus as defined in claim 6, further comprising a mandrel located in said outlet opening centrally thereof and extending transversely across said intermediate zone.

10. In an apparatus as defined in claim 5, further comprising an outlet opening for processed material provided in a wall bounding said chamber in a region of said ends of said one screw in said intermediate zone of said chamber.

* * * * *